though the member 31 and being held therein by a cotter 32.

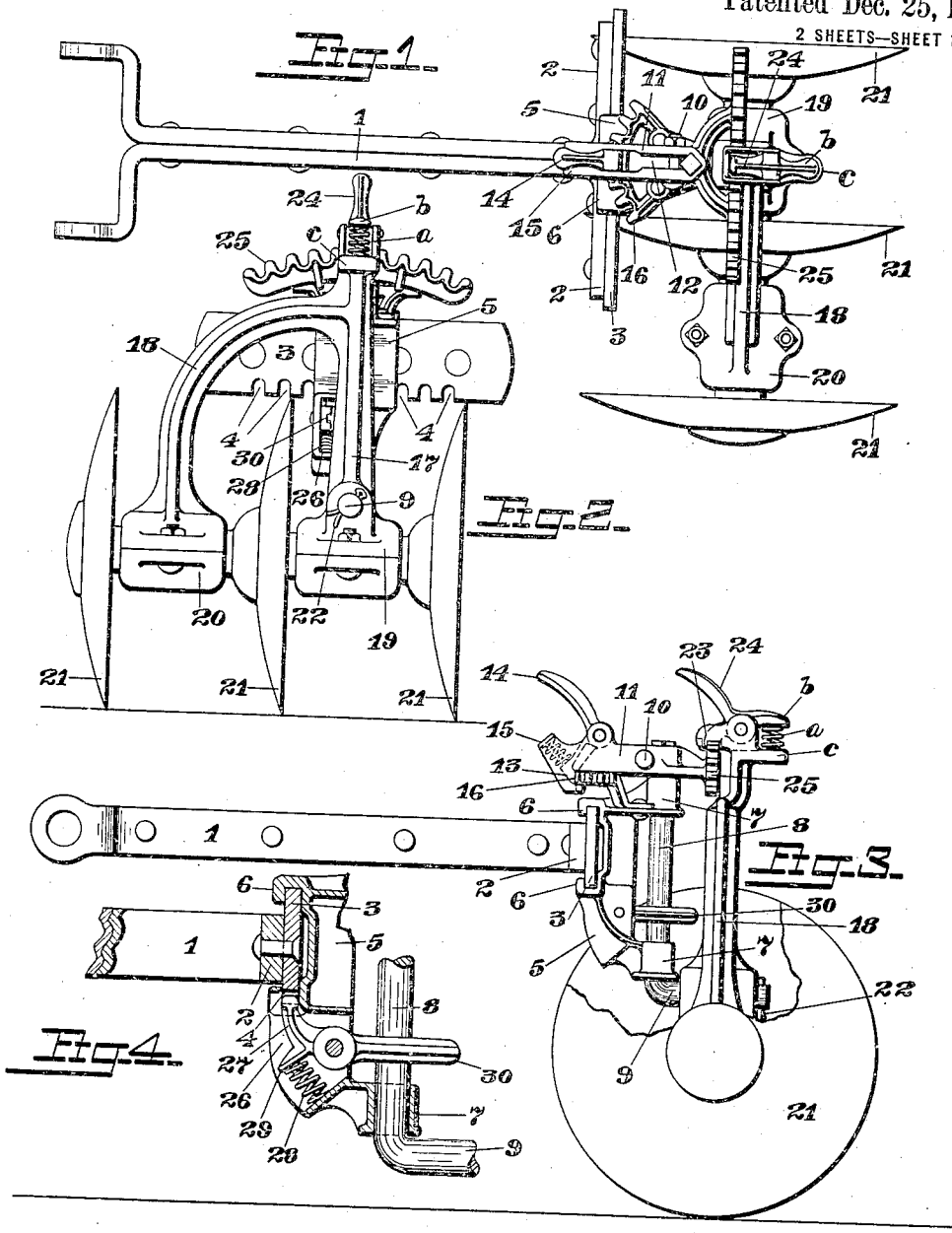

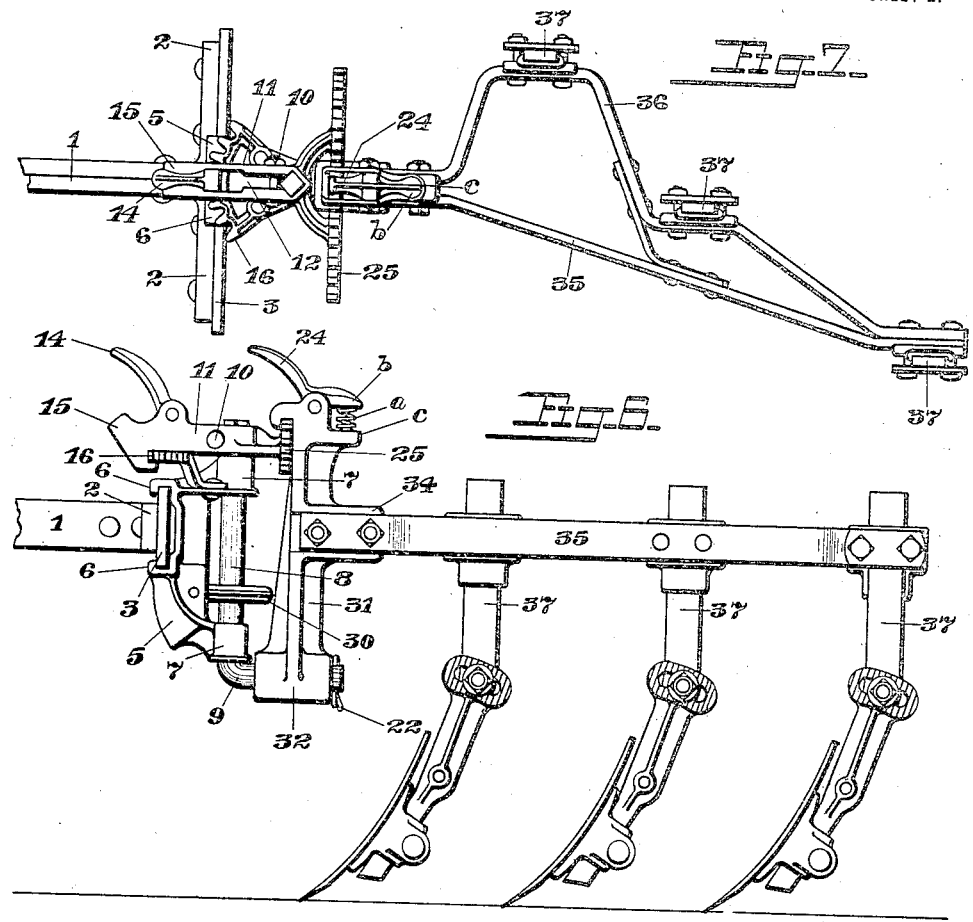

UNITED STATES PATENT OFFICE.

WESLEY A. PAUL, DECEASED, LATE OF MOLINE, ILLINOIS, BY LOLA V. PAUL, ADMINISTRATRIX, OF MOLINE, ILLINOIS, ASSIGNOR TO DEERE & COMPANY, OF MOLINE, ILLINOIS, A CORPORATION OF ILLINOIS.

CULTIVATOR.

1,251,096.  Specification of Letters Patent.  Patented Dec. 25, 1917.

Application filed April 7, 1915. Serial No. 19,654.

*To all whom it may concern:*

Be it known that WESLEY A. PAUL, late a citizen of the United States and a resident of Moline, in the county of Rock Island and State of Illinois, did invent certain new and useful Improvements in Cultivators, of which the following is a specification, reference being had therein to the accompanying drawing.

The invention relates to cultivators particularly to that type in which the earth treating members are arranged in gangs, and the object of my invention is to provide means for adjusting the gangs to different positions that are necessary for proper cultivation.

Referring to the drawings, in which similar numerals indicate identical parts, there is shown one gang of disks only where two are normally employed to operate on opposite sides of a row of plants. Both gangs however have a similar construction and are adjusted in a similar manner, so that a description of one will suffice for both.

Figure 1 is a plan view of a gang of disks connected to a cultivator beam.

Fig. 2 is a rear elevation of Fig. 1.

Fig. 3 is a side elevation of Fig. 1.

Figs. 4 and 5 are enlarged detail sections.

Fig. 6 is a modification of the device illustrating a gang of cultivator shovels connected therewith, and Fig. 7 is a plan view of Fig. 6.

As illustrated 1 is a cultivator beam adapted to be connected at its forward end to the frame of a cultivator. Extending laterally from the rear end of the beam 1, and preferably integral therewith, are arms 2 to which is rigidly secured a bar 3 having a series of notches 4 in the lower edge thereof. Mounted on the bar 3 is a bracket 5 formed with projecting portions 6 which overlap the upper and lower edges of the bar 3 forming a guideway for lateral adjustment of the bracket 5. The upper and lower portions of the bracket 5 project rearwardly and terminate in vertical bearings 7 in which is journaled the vertical portion of a spindle 8 having its lower end 9 bent at a right angle to the vertical portion and extended rearward. The upper end of the spindle 8 is squared and has clamped thereon rigidly, by a bolt 10, a member 11 having a longitudinal slot 12 in which is pivotally mounted a dog 13 adapted to be rocked by operation of an arm 14.

The dog 13 operates in a box 15 in the rear end of the member 11 and engages with a horizontally disposed notched segment 16 rigidly mounted on the bracket 5; a coiled spring 17, in the box 15, holds the dog 13 in any notch in the segment 16 with which it may be engaged; the under rear edge of the box 15 projects beneath the notched segment 16 to insure accuracy in the engagement of the dog and segment. As shown in Figs. 1, 2 and 3 disks are employed as earth treating members and are mounted in the following manner: a yoke, having a vertical arm 17 and a curved arm 18, on the ends of which are bearings 19 and 20, of a well known type, having journaled therein a shaft upon which are mounted disks 21 in a manner well known in the art, the disks being free to revolve.

In the top of the box 19 is formed a bearing through which the portion 9 of the spindle 8 projects and is held therein by a cotter 22; at the upper end of the vertical arm 17 is pivotally mounted a dog 23 which is rockable by means of an arm 24 preferably integral therewith; the dog 24 is adapted to engage with any one of a series of notches in a segment 25 on a rearwardly extending portion of the member 11, the dog being held in normal engagement with any one of said notches in the segment 25 by a coil spring *a* which is secured between a rearward extension *b* of the arm 24 and a projection *c* on the vertical arm 17.

Pivotally mounted in a recess 26 in the lower part of the bracket 5 is a dog 27 adapted to engage with the notches 4 in the bar 3 and retained in such engagement by a coiled spring 28 secured between the lower wall of the recess 26 and a projection 29 on the dog 27; by operating an arm 30, extending rearwardly from the dog 27, and preferably integral therewith; the dog 27 is rocked upon its pivot to disengage it from the notches 4 in the bar 3.

Figs. 6 and 7 illustrate the manner of attaching a gang of shovels removing the yoke from the portion 9 of the spindle 8 and substituting therefor a vertical member 31, the portion 9 of the spindle 8 projecting through a bearing 32 and being secured therein by a pin or cotter 33. Extending rearward from the member 31, and substantially in line with the beam 1, is a projecting portion 34 of the member 31 to which are bolted beams 35 and 36 forming supports for standards 37 carrying shovels of any desired type.

The upper end of the member 31 is provided with means to engage with the segment 25 similar to those employed with the yoke, and the same numerals are employed in each case.

The improvements shown constitute various adjustments by which the cultivating devices employed can be adapted to different conditions of cultivation; to move a gang toward or from the center of the cultivator for wide or narrow rows, operate the arm 30 to release the dog 27 from the notch in the bar 3, with which it may be engaged, freeing the bracket 5 so that can be moved on the bar 3 in the direction desired, and secured in its new position by the dog 3 engaging with the adjacent notch. To angle the gangs horizontally the dog 13 is released from the notched segment 16 so as to allow the spindle 8 to be turned in its bearings on the bracket 5 until the cultivating gang has been adjusted as desired, when the dog 13 is again engaged with the notched segment 16 and the gang is held against further horizontal movement. In adjusting the gangs for operation with hilled or furrowed crops and it is desired to tilt the gangs at an angle to the horizontal, the dog 24 is disengaged from the segment 25 by pressure on the extension b and the gang is free to be tilted, rocking on the portion 9 of the spindle 8, to the position desired where it can be held by the dog 23 engaging with the notched segment 25. The same adjustments are utilized for the shovel gang as will be readily understood.

Using any type of cultivating devices, they can be readily adjusted to varied positions as the work may require when mounted similar to the devices shown and described.

What is claimed is—

1. In a cultivator, the combination of a rearwardly extending beam, a laterally adjustable bracket supported on the beam and having bearings at the top and bottom thereof, a vertical spindle pivotally supported in said bearings and having its lower end extending rearwardly, a gang of cultivating devices pivotally supported on the lower end of the spindle, and means for swinging the gang horizontally and for tilting it on said pivotal supports.

2. In a cultivator, the combination of a rearwardly extending beam, a laterally adjustable bracket supported on the beam and having bearings at the top and bottom thereof, a vertical spindle pivotally supported in said bearings and having its lower end extending rearwardly, a gang of cultivating devices pivotally supported on the lower end of the spindle, means for swinging the gang horizontally and for tilting it on said pivotal supports, and means for holding it in any adjusted position.

3. In a cultivator, the combination of a rearwardly extending beam, a bracket supported on the beam and laterally adjustable to varying positions thereon, a bearing on the bracket above the beam, a bearing on the bracket below the beam, a vertical spindle pivotally supported in said bearings and having its lower end extending rearwardly, a gang of cultivating devices pivotally supported on the lower end of the spindle, means for swinging the gang horizontally and for tilting it on said pivotal supports, and means for holding it in any adjusted position.

4. In a cultivator, the combination of a beam, a bracket slidably supported on the beam and having its upper and lower ends extended rearwardly, bearings in said ends, a vertical spindle journaled to oscillate in said bearings and having its lower end extending rearwardly, a gang of cultivating devices pivotally supported on the lower end of said spindle, means for swinging the gang horizontally and for tilting it on said pivotal supports, and means for holding it in any adjusted position.

5. In a cultivator, the combination of a beam, a bracket slidably supported on the beam, a spindle vertically supported in bearings on said bracket and having its lower end extending rearwardly, a yoke having downwardly extending arms, one of said arms having a bearing in which the lower end of the spindle is journaled, a gang of cultivating devices supported in bearings on the arms of said yoke, said yoke adapted to be rocked on the lower end of the spindle to vary the position of the gang, and means to hold said gang in varied positions.

6. In a cultivator, the combination of a beam, a bracket slidably supported on the beam, a spindle vertically and rotatably supported in bearings on said bracket and having its lower end extending rearwardly, a notched segment horizontally disposed and mounted on the bracket, a member secured on the upper end of said spindle and actuated to rotate the latter, a dog mounted on said member and adapted to engage with the notches in said segment, a yoke having downwardly extending arms, one of said arms having a bearing in which the lower end of the spindle is journaled, a gang of cultivating devices supported in bearings on the arms of said yoke, said yoke adapted to be rocked on the lower end of the spindle to vary the position of the gang in a vertical direction, an upright segment on the member on the upper end of the spindle, and a dog on the apex of the yoke to engage with said segment to hold the gang in position.

7. In a cultivator, the combination of a rearwardly extending beam, a laterally extending bar secured to the rear end of the beam, a bracket slidably mounted in said bar for lateral adjustment, co-acting means on said bracket and bar to hold the latter in an adjusted position, bearings in the upper and lower ends of said bracket, a vertical spindle journaled in said bearings and having its lower end extending rearwardly, a gang of cultivating devices pivotally supported on the lower end of the spindle, means for swinging the gang horizontally and for tilting it on said pivotal supports, and means for holding it in any adjusted position.

In testimony whereof I affix my signature, in presence of two witnesses.

LOLA V. PAUL,
*Administratrix of the estate of Wesley A. Paul, deceased.*

Witnesses:
JESSIE SIMSER,
W. G. DUFFIELD.

Copies of this patent may be obtained for five cents each, by addressing the "Commissioner of Patents, Washington, D. C."